(12) United States Patent
Rajzer et al.

(10) Patent No.: US 12,047,028 B2
(45) Date of Patent: Jul. 23, 2024

(54) METHOD OF BRAKING A POWER TOOL

(71) Applicant: Snap-on Incorporated, Kenosha, WI (US)

(72) Inventors: Michael Rajzer, Greendale, WI (US); Jason Genz, Greendale, WI (US)

(73) Assignee: Snap-on Incorporated, Kenosha, WI (US)

( * ) Notice: Subject to any disclaimer, the term of this patent is extended or adjusted under 35 U.S.C. 154(b) by 853 days.

(21) Appl. No.: 17/122,285

(22) Filed: Dec. 15, 2020

(65) Prior Publication Data

US 2022/0190752 A1 Jun. 16, 2022

(51) Int. Cl.
| | |
|---|---|
| *H02P 3/00* | (2006.01) |
| *B25F 5/00* | (2006.01) |
| *H02P 3/06* | (2006.01) |
| *H02P 3/08* | (2006.01) |
| *H02P 3/12* | (2006.01) |
| *H02P 6/24* | (2006.01) |
| *H02P 3/18* | (2006.01) |

(52) U.S. Cl.
CPC .............. *H02P 3/08* (2013.01); *B25F 5/001* (2013.01); *H02P 3/06* (2013.01); *H02P 3/12* (2013.01); *H02P 6/24* (2013.01); *H02P 3/18* (2013.01)

(58) Field of Classification Search
CPC ...... H02P 3/08; H02P 3/06; H02P 3/12; H02P 6/24; B25F 5/001
USPC ........................................................ 318/375
See application file for complete search history.

(56) References Cited

U.S. PATENT DOCUMENTS

| | | | |
|---|---|---|---|
| 1,497,780 | A | 6/1924 | Gazda |
| 1,934,506 | A | 11/1933 | King et al. |
| 2,213,892 | A | 12/1937 | West |
| 2,172,245 | A | 9/1939 | Harwood |
| 2,479,397 | A | 8/1949 | Newhouse |
| 2,484,213 | A | 10/1949 | Fitzgerald |
| 2,526,893 | A | 10/1950 | Newman et al. |
| 2,567,635 | A | 9/1951 | Bundy |
| 2,575,021 | A | 11/1951 | Leitch et al. |
| 2,855,553 | A | 10/1958 | Morgan |
| 2,926,292 | A | 2/1960 | Hart et al. |
| 2,989,675 | A | 6/1961 | Lowe |

(Continued)

FOREIGN PATENT DOCUMENTS

| | | |
|---|---|---|
| CN | 104660121 B | 5/2015 |
| CN | 109347376 A | 2/2019 |

(Continued)

OTHER PUBLICATIONS

Taiwan Office Action for corresponding Application No. 11120675840 dated Jul. 11, 2022, 6 pages.

(Continued)

*Primary Examiner* — Erick D Glass
(74) *Attorney, Agent, or Firm* — Taft Stettinius & Hollister LLP

(57) ABSTRACT

A two-stage braking method for a brushless DC (BLDC) motor. The method includes control a switching array to drive the BLDC motor according to a commutation scheme to decrease a speed of the BLDC motor, allow the BLDC motor to coast, determine the speed of the BLDC motor, and actuate high side switches and/or low side switches to substantially stop rotational movement of the BLDC motor.

18 Claims, 3 Drawing Sheets

(56) References Cited

U.S. PATENT DOCUMENTS

| | | | |
|---|---|---|---|
| 3,153,182 | A | 10/1964 | Choudhury |
| 3,866,100 | A | 2/1975 | Palenchar et al. |
| 4,395,670 | A | 7/1983 | Podell |
| 4,514,677 | A | 4/1985 | Kaufman, III et al. |
| 5,828,194 | A | 10/1998 | Canova |
| 5,982,063 | A | 11/1999 | Lutz et al. |
| 6,094,025 | A | 7/2000 | Rosa |
| 6,104,155 | A | 8/2000 | Rosa |
| 6,236,177 | B1 | 5/2001 | Zick et al. |
| 7,011,000 | B2 | 3/2006 | Kushida et al. |
| 7,023,159 | B2 | 4/2006 | Gorti et al. |
| 7,055,620 | B2 | 6/2006 | Nadig et al. |
| 7,270,591 | B2 | 9/2007 | Deshpande et al. |
| 7,723,952 | B2 | 5/2010 | Phillips et al. |
| 8,030,861 | B2 | 10/2011 | Hoogzaad |
| 8,093,844 | B2 | 1/2012 | Milesi et al. |
| 8,466,641 | B2 | 6/2013 | Kaufmann et al. |
| 8,567,521 | B2 | 10/2013 | Lau |
| 8,587,230 | B2 | 11/2013 | Pant et al. |
| 8,587,231 | B2 | 11/2013 | Pant |
| 9,438,141 | B2 | 9/2016 | Ishikawa et al. |
| 9,496,809 | B2 | 11/2016 | Nakano et al. |
| 10,177,691 | B2 | 1/2019 | Eshleman et al. |
| 2002/0158593 | A1 | 10/2002 | Henderson et al. |
| 2007/0287365 | A1 | 12/2007 | Deshpande et al. |
| 2009/0243521 | A1* | 10/2009 | Tieu .................. H02P 3/18 |
| | | | 318/367 |
| 2009/0309527 | A1 | 12/2009 | Anuradha et al. |
| 2012/0019177 | A1 | 1/2012 | Kaufmann et al. |
| 2012/0074881 | A1 | 3/2012 | Pant et al. |
| 2015/0091480 | A1 | 4/2015 | Kischka et al. |
| 2017/0093315 | A1 | 3/2017 | Ichikawa |
| 2017/0093321 | A1 | 3/2017 | Ichikawa |
| 2017/0234484 | A1* | 8/2017 | Vanko .................. B24B 23/028 |
| | | | 173/176 |
| 2017/0264219 | A1 | 9/2017 | Takeda |
| 2018/0370010 | A1 | 12/2018 | Xie et al. |
| 2020/0343840 | A1* | 10/2020 | Vanko ...................... H02P 6/06 |
| 2020/0389109 | A1 | 12/2020 | Yajurvedi et al. |

FOREIGN PATENT DOCUMENTS

| | | |
|---|---|---|
| EP | 3267574 A1 | 1/2018 |
| JP | 04000284 | 1/1992 |
| JP | 2002271916 | 9/2002 |
| JP | 2018042297 A | 3/2018 |
| WO | 9963643 A1 | 12/1999 |

OTHER PUBLICATIONS

Taiwan Office Action for corresponding Application No. 11121226670 dated Dec. 13, 2022, 3 pages.
Combined Search and Examination Report for corresponding Application No. GB2116771.3 dated May 17, 2022, 6 pages.
Australian Examination Report No. 1 for corresponding AU Application No. 2021273535, dated Nov. 15, 2022, 6 pages.
Canadian Office Action for corresponding Application No. 3,141,228 dated Jan. 16, 2023, 4 pages.
Examination Report No. 2 for corresponding Application No. 2021273535 dated Jun. 20, 2023, 3 pages.
Examination Report No. 2 for corresponding Application No. 2021273535 dated Aug. 23, 2023, 4 pages.
Examination Report No. 2 for corresponding Application No. 2021273535 dated Nov. 3, 2023, 3 pages.

* cited by examiner

METHOD OF BRAKING A POWER TOOL

TECHNICAL FIELD OF THE INVENTION

The present invention relates generally to braking an electric brushless motor of a power tool.

BACKGROUND OF THE INVENTION

Power tools, such as motorized ratchet wrenches, drills, sanders, and drivers, driven by brushless DC (BLDC) motors are commonly used in automotive, industrial, and household applications to tighten and untighten work pieces, such as threaded fasteners, and to apply a torque and/or angular displacement to a work piece, for example. Power tools typically use one of three methods to brake a BLDC motor. One method allows the BLDC motor to coast to a stop when power is stopped. While this method does not damage electrical switches or other circuit components of the power tool, it is time consuming, cumbersome, and could potentially be dangerous, to a user. For example, if a user needs to immediately stop rotation of a BLDC motor for a safety reason (e.g., a piece of clothing gets caught in the tool), by allowing the BLDC motor to coast to a stop, instead of immediately stopping, it could cause physical harm to the user.

Another method slows the BLDC motor to a stop using brushless motor commutation implemented in software using a microcontroller or microprocessor computer. For example, the commutation scheme can be implemented by the microcontroller or microprocessor computer to drive the motor in the reverse direction. However, this method requires a high bus voltage capacitance to prevent damage to electrical switches or other electrical components of the power tool during the braking. Moreover, this method can also cause premature wear to the BLDC motor components.

The third method actuates all of the high side electrical switches or all of the low side electrical switches on at once shorting the motor phases together and stopping the motor. However, this method can cause high currents to flow through the electrical switches, which can damage the electrical switches or other electrical components of the power tool.

SUMMARY OF THE INVENTION

The present invention relates broadly to braking an electric brushless (BLDC) motor of a power tool in two stages. In a first stage, a controller alternately commutates the BLDC motor and coasts the BLDC motor to allow the BLDC motor to slow to a lower speed. When the controller commands a lower speed and commutates the BLDC motor, the bus voltage will increase, but when the BLDC motor is allowed to coast, the bus voltage decreases. As this step is repeated, the speed of the BLDC motor decreases quickly. In a second stage, once energy left in the motor is minimal, all three high or low side switches turn on to completely brake the motor. This two stage braking method rapidly brings the BLDC motor to a stop, does not allow the bus voltage to increase to damaging levels, and minimizes the chances of high currents that could cause damage from flowing through the electrical switches or other electrical components of the power tool.

In an embodiment, the present invention broadly comprises a computer implemented method of braking an electric brushless (BLDC) motor of a power tool in two stages. The method including controlling a switching array to drive the BLDC motor according to a commutation scheme to slow a speed of the BLDC motor, allowing the BLDC motor to coast, determining the speed of the BLDC motor, and actuating all high and/or low side switches to substantially stop rotational movement of the BLDC motor.

In another embodiment, the present invention broadly comprises a power tool. The power tool includes a BLDC motor adapted to drive a drive lug of the power tool, a switching array adapted to selectively supply power from a power source to the BLDC motor, and a controller adapted to control a switching array to drive the BLDC motor according to a commutation scheme to slow a speed of the BLDC motor, allow the BLDC motor to coast, determine the speed of the BLDC motor, and actuate all high and/or low side switches to substantially stop rotational movement of the BLDC motor.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
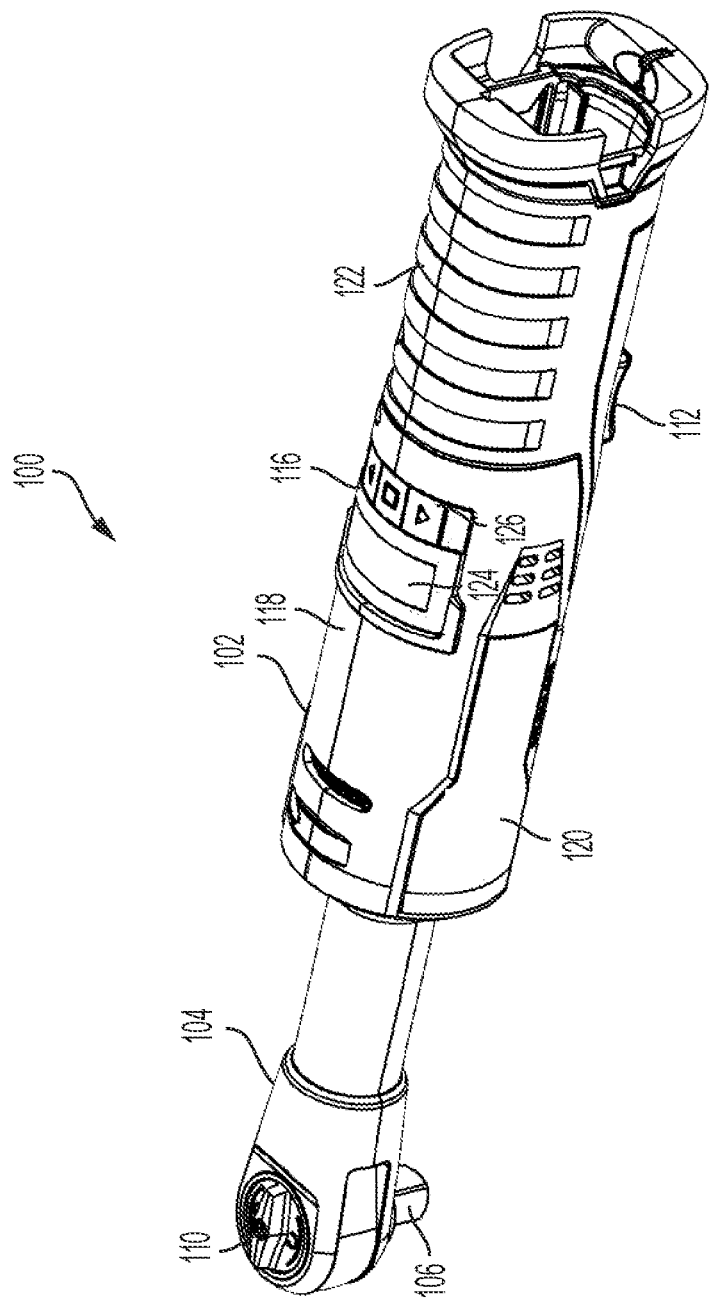
FIG. 1 is a perspective view of an exemplar tool, such as a motorized ratchet tool, that includes a brushless DC motor controlled, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly relates to a two-stage braking method for an electrically operated brushless (BLDC) motor. In the first stage, a combination of motor commutation and coasting is utilized to slow the rotational speed of the BLDC motor. In the second stage, all three low-side or three high-side electrical switches are actuated to bring the BLDC motor to a complete stop. This braking method rapidly brings the BLDC motor to a stop without the negative consequences of current solutions, thereby improving the usability, life span, and efficiency of BLDC motors in power tools.

Figure 2:
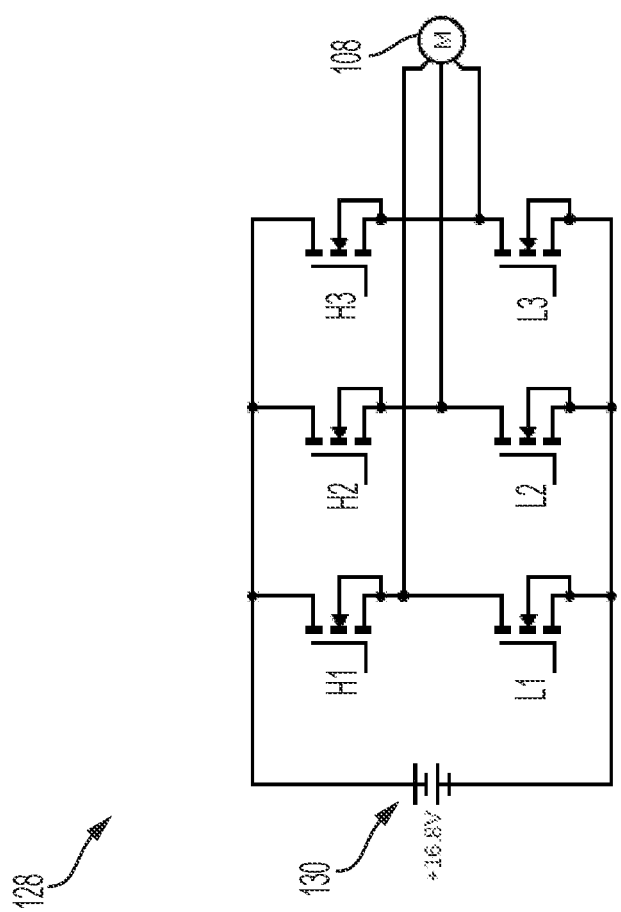
FIG. 2 is an exemplar switching schematic for a power tool having a brushless DC motor, according to an embodiment of the present invention.
Figure 3:
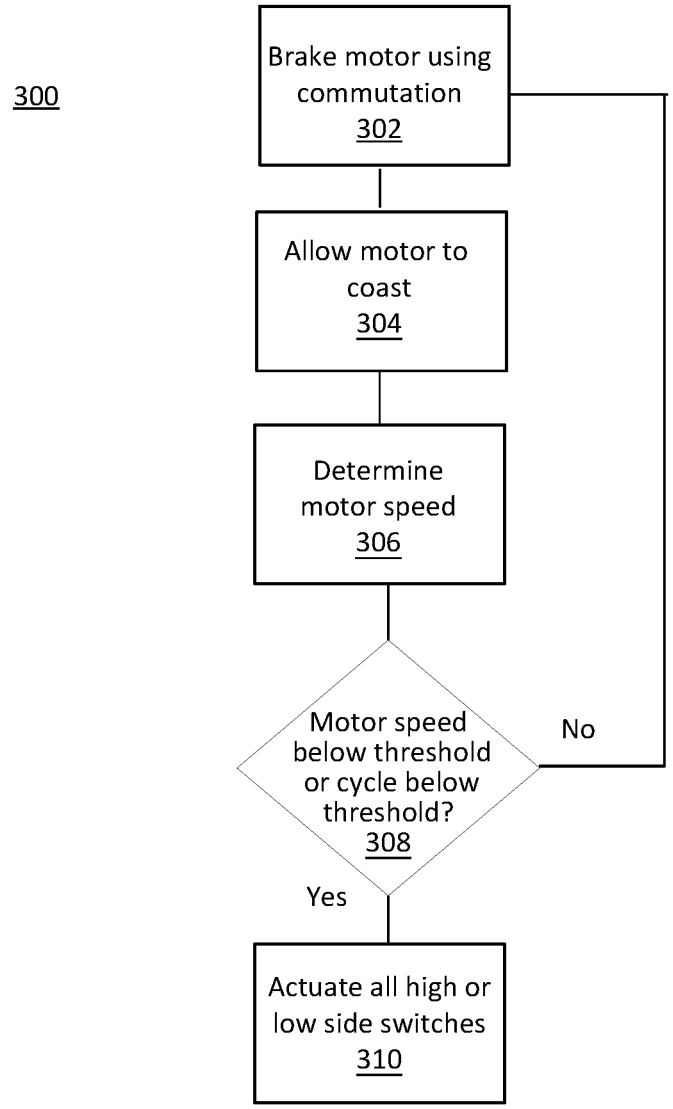
FIG. 3 is a flow chart illustrating a method of braking an electric brushless (BLDC) motor of a power tool, according to an embodiment of the present invention.

Referring to FIGS. 1-3, a tool 100, such as, for example, a motorized ratchet tool, includes a housing portion 102 adapted to be held by a user, and a driver portion 104 coupled to the housing portion 102. The driver portion 104 is adapted to apply torque to a work piece and includes a drive lug 106 adapted to engage a tool (e.g., socket or bit) to drive the work piece, for example, in a well-known manner. The drive lug 106 is operatively coupled to and driven by an electric brushless DC (BLDC) motor 108 disposed in the housing of the tool (not shown) via a ratcheting mechanism (not shown) of the driver portion 104 in a well-known manner. The driver portion 104 also includes a selector knob 110 adapted to select a rotational drive direction of the drive lug 106 (i.e., clockwise or counter-clockwise). The driver portion 104 may be a ratchet head of a ratchet tool.

The housing portion 102 operably houses one or more of the BLDC motor 108 adapted to drive the drive lug 106, a trigger 112 adapted to actuate the BLDC motor 108, a power source (not shown) adapted to provide electrical power for the BLDC motor, such as a battery, a controller, and a display assembly 116 (described in more detail below). In an embodiment, the housing portion 102 is assembled from two or more clamshell housing portions 118, 120 coupled together to cooperatively form the housing portion 102 and couple to the driver assembly 104, thereby enclosing the BLDC motor 108 and the controller within the housing portion 102. The housing portion 102 may also include a handle portion 122 that a user may grip or hold during operation of the tool 100.

The BLDC motor 108 can be electrically coupled to the power source via the trigger 112 in a well-known manner. The power source can be external (e.g., an electrical wall outlet, generator, external battery, etc.) or internal (e.g., a removable and rechargeable battery). The trigger 112 can be adapted to cause the BLDC motor 108 to be turned ON and OFF, or cause electric power/voltage to flow from the power source to the BLDC motor 108 or cease flow from the power source to the BLDC motor 108.

The trigger 112 can be an actuation mechanism that employs a push button actuator or other type of actuator. For example, the user can depress the trigger 112 inwardly to selectively cause power to be drawn from the power source to cause the BLDC motor 108 to rotate and provide torque to the driver portion 104 in a desired rotational direction. Any suitable trigger 112 or switch can be implemented without departing from the spirit and scope of the present invention. For example, the trigger 112 can be a toggle actuator, a touch sensitive actuator, a slide actuator, or other suitable actuator or device. In another example, the trigger 112 can be biased such that the trigger 112 is depressible inwardly, relative to the housing portion 102, to cause the tool 100 to operate, and releasing the trigger 112 causes the trigger 112 to move outwardly, relative to the housing portion 102, to cease operation of the tool 100 via the biased nature of the trigger 112. The trigger 112 may also be a variable speed type mechanism. In this regard, relative actuation or depression of the trigger 112 causes the BLDC motor 108 to operate at variable speeds, depending on the depression level of the trigger 112.

The display assembly 116 includes a display 124 adapted to indicate tool information to the user. In an embodiment, the display 124 is an LCD. The tool information can include, for example, a tool status, such as, for example, a power level of the power source, a selected driving direction of the drive lug 106, a power state of the motor, output torque of the tool 100, etc. The display assembly 116 further includes one or more buttons 126 adapted to receive a user input, such as, for example, selecting what is to be shown on the display 124, for selecting tool parameters, such as, for example, the driving direction of the drive lug 106, and/or for otherwise manipulating the display 124 to control the tool 100 and/or parameters of the tool 100.

An example switching schematic for the BLDC motor 108 of the power tool 100 is illustrated in FIG. 2. In this example, a three-phase BLDC motor and a switching array 128 are shown. However, any suitable BLDC motor can be used and the invention is not limited as such. In an embodiment, the switching array 128 includes high-side switching elements, H1, H2, and H3, and low-side switching elements, L1, L2, and L3, each having an actuated state and a non-actuated state. In an embodiment, the switching elements are field-effect transistors (FETs). The switching array 128 is controlled by the controller to selectively apply power from a power source 130 (e.g., a battery pack) to the BLDC motor 108 to achieve a desired commutation scheme. In other words, the switching elements are actuated between actuated and a non-actuated states in a specific sequence determined by the motor design in order to spin the motor.

The speed at which the motor spins is controlled through open or closed loop control of the pulse width modulation (PWM) duty cycle of the switching elements. For example, as the PWM duty cycle decreases, the time that the switching elements are in the actuated state decreases, and the time that the switching elements are in the non-actuated state increases, thereby slowing down the motor 108.

The controller is a controller/processor that includes a central processing unit (CPU) for processing data and executing non-transitory computer-readable instructions using known methods. For example, the controller retrieves instructions from data storage via a bus, using a memory for runtime temporary storage of instructions and data. The memory may include volatile and/or nonvolatile random access memory (RAM). The components may also be connected to other components in addition to (or instead of) being connected to other components via the bus. The controller monitors, analyzes, and processes electric signals from sensors such as, for example, one or more current sensors, one or more speed sensors, one or more Hall Effect sensors, one or more temperature sensors, etc. For example, the speed of the motor 108 can be determined or calculated by the controller using a plurality of Hall Effect sensors which sense the rotational position of a rotor, in a well-known manner.

FIG. 3 is a block chart showing a method performed by a computing device, such as the controller, to brake or stop an electric brushless (BLDC) motor of a power tool. The controller controls the switching array 128 according to a commutation scheme for a desired amount time to decrease the speed of the BLDC motor 108 (302). In one embodiment, this amount of commutation time can be based on a constant number, such as, for example, approximately 10 milliseconds or 100 PWM cycles. However, the invention is not limited as such and the commutation time can be any suitable amount of time, such as, for example, between about 1-1000 milliseconds. In another embodiment, the amount of commutation time can vary, such as, for example, the commutation time is equal to the amount of time to count a specific number of hall transitions. In this example, since there are a fixed number of hall transitions per rotation, the commutation time will be very short while the motor 108 is rotating quickly (e.g., 500 microseconds if the motor is spinning at 30,000 RPM) and very long when the motor 108 is rotating slowly (e.g., 15 milliseconds if the motor is spinning at 1,000 RPM).

After the desired amount of time spent commutating has passed, the BLDC motor 108 is allowed to coast for a desired amount of time (304) In an embodiment, the amount of time can be based on a constant number, such as, for example, about 10 millisecond or 100 PWM cycles. However, the invention is not limited as such and the time can be any suitable amount of time, such as, for example, between about 1-1000 milliseconds. In another embodiment, the amount of time can vary, such as, for example, the time is equal to the amount of time to count a specific number of hall transitions. In this example, since there are a fixed number of hall transitions per rotation, the commutation time will be very short while the motor 108 is rotating quickly (e.g., 500 microseconds if the motor is spinning at 30,000 RPM) and very long when the motor 108 is rotating slowly (e.g., 15 milliseconds if the motor is spinning at 1,000 RPM).

The controller is adapted to determine the speed of the BLDC motor 108 (306), and then determines whether the speed of the BLDC motor 108 is at or below a speed threshold and/or the duty cycle is at or below a cycle threshold (308). For example, the speed threshold could be 10% or less of the motor's maximum no load speed and/or 10% or less of the maximum duty cycle. When the speed of the BLDC motor 108 is above the speed threshold and/or the duty cycle above the cycle threshold, the controller proceeds back to step 302. For example, the controller alternates between slowing the BLDC motor 108 down using the commutation scheme (302) and allowing the BLDC motor 108 to coast (304) until the speed of the BLDC motor 108 is below the speed threshold and/or the duty cycle is below the cycle threshold.

When the speed of the BLDC motor 108 is at or below the speed threshold and/or the duty cycle is at or below the cycle threshold, the controller actuates all three high side switching elements (H1, H2, H3) or all three low side switching elements (L1, L2, L3) for a desired amount of time to substantially stop rotational movement of the BLDC motor 108 (310). For example, this time is between about 1 millisecond and 15 milliseconds. The time is at least partially dependent on the size of the motor 108 and the load applied to the motor 108. If the load on the motor 108 is substantial, this time could be much higher in order to bring the motor 108 a full stop. The speed threshold for this step could be set to any speed less than the motor's maximum no load speed, such as, for example, 10,000 RPM for a 25,000 RPM motor. If a duty cycle threshold is used, the duty cycle threshold can be set to any value less than the maximum duty cycle of 100%, such as, for example, 10%. After the desired amount of time that the switching elements are actuated, pre-drivers for the switching elements are configured to an OFF state by the controller.

As discussed above, the aspects of the present invention are described in terms of a motorized ratchet tool, as shown. However, it should be understood that aspects of the present invention could be implanted in other hand tools or implements. For example, and without limitation, the hand tool can be ratchet wrench, open wrench, screw driver, nut driver, impact wrench, impact driver, or any other tool capable of applying torque to a work piece and is powered by a BLDC motor.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of braking a brushless DC (BLDC) motor of a power tool, comprising:
   controlling a switching array to drive the BLDC motor according to a commutation scheme to decrease a speed of the BLDC motor;
   allowing the BLDC motor to coast;
   determining the speed of the BLDC motor; and
   when the speed of the BLDC motor is less than a speed threshold, actuating at least three high side switching elements or at least three low side switching elements to substantially stop rotational movement of the BLDC motor.

2. The method of claim 1, further comprising when the speed of the BLDC motor is greater than the speed threshold, repeating the steps of controlling a switching array to drive the BLDC motor according to a commutation scheme to decrease a speed of the BLDC motor and allowing the BLDC motor to coast until the speed is less than the speed threshold.

3. The method of claim 2, wherein the speed threshold is less than a maximum no load speed of the motor.

4. The method of claim 1, wherein the steps of controlling a switching array to drive the BLDC motor according to a commutation scheme to decrease a speed of the BLDC motor, and allowing the BLDC motor to coast, are repeated until a duty cycle decreases below a duty cycle threshold.

5. The method of claim 4, wherein the duty cycle threshold is less than a maximum duty cycle of a controller of the power tool.

6. The method of claim 1, wherein the step of controlling a switching array to drive the BLDC motor according to a commutation scheme to decrease a speed of the BLDC motor is performed for less than about 1000 milliseconds.

7. The method of claim 1, wherein the step of allowing the BLDC motor to coast is performed for less than about 1000 milliseconds.

8. A power tool having a brushless DC (BLDC) motor and a power source comprising:
   a switching array adapted to selectively apply power from the power source to the BLDC motor; and
   a controller adapted to:
      control the switching array to drive the BLDC motor according to a commutation scheme to decrease a speed of the BLDC motor;
      allow the BLDC motor to coast;
      determine the speed of the BLDC motor; and
      when the speed of the BLDC motor is less than a speed threshold, actuate at least three high side switching elements or at least three low side switching elements to substantially stop rotational movement of the BLDC motor.

9. The power tool of claim 8, wherein when the speed of the BLDC motor is greater than the speed threshold, the controller is adapted to control the switching array to drive the BLDC motor according to the commutation scheme to decrease the speed of the BLDC motor and allow the BLDC motor to coast repeatedly until the speed is below the speed threshold.

10. The power tool of claim 9, wherein the speed threshold is less than a maximum no load speed of the motor.

11. The power tool of claim 8, wherein the controller is adapted to control the switching array to drive the BLDC motor according to a commutation scheme to decrease the speed of the BLDC motor and allow the BLDC motor to coast repeatedly until a duty cycle decreases below a duty cycle threshold.

12. The power tool of claim 11, wherein the duty cycle threshold is less than a maximum duty cycle of the controller.

13. The power tool of claim 8, wherein the controller is adapted to control the switching array to drive the BLDC motor according to the commutation scheme to decrease the speed of the BLDC motor for less than about 1000 milliseconds.

14. The power tool of claim 8, wherein the controller is adapted to allow the BLDC motor to coast for less than about 1000 milliseconds.

15. The power tool of claim 8, wherein when the speed of the BLDC motor is less than the speed threshold, the controller is adapted to actuate all of the high side switching elements or all of the low side switching elements to substantially stop rotational movement of the BLDC motor.

16. The power tool of claim 8, wherein the controller is adapted to actuate the high side switching elements and the low side switching elements.

17. A method of braking a brushless DC (BLDC) motor, comprising:
controlling a switching array having switching elements to drive the BLDC motor according to a commutation scheme to decrease a speed of the BLDC motor;
allowing the BLDC motor to coast;
determining a duty cycle of the switching elements; and
when the duty cycle of the switching elements is less than a duty cycle threshold, actuating three high side switching elements or three low side switching elements to substantially stop rotational movement of the BLDC motor.

18. The method of claim 17, wherein the duty cycle is less than a maximum duty cycle of the controller.

* * * * *